R. G. AVERILL.
TROLLEY TENDER.
APPLICATION FILED AUG. 5, 1918.

1,353,508.

Patented Sept. 21, 1920.
2 SHEETS—SHEET 1.

Witness
S. S. Matthes

Inventor
Rex G. Averill

By
Attorney

R. G. AVERILL.
TROLLEY TENDER.
APPLICATION FILED AUG. 5, 1918.

1,353,508.

Patented Sept. 21, 1920.
2 SHEETS—SHEET 2.

Witness
S. S. Matthis

Inventor
Rex G. Averill

By
Attorney

UNITED STATES PATENT OFFICE.

REX G. AVERILL, OF MANSFIELD, OHIO, ASSIGNOR TO THE OHIO BRASS COMPANY, OF MANSFIELD, OHIO, A CORPORATION OF NEW JERSEY.

TROLLEY-TENDER.

1,353,508.          Specification of Letters Patent.          Patented Sept. 21, 1920.

Application filed August 5, 1918. Serial No. 248,324.

*To all whom it may concern:*

Be it known that I, REX G. AVERILL, a citizen of the United States, residing at Mansfield, in the county of Richland and State of Ohio, have invented certain new and useful Improvements in Trolley-Tenders, of which the following is a specification.

This invention relates to a device for maintaining the trolley rope at all times in a taut condition as the trolley pole to which the trolley rope is attached moves up and down, depending upon the variation in elevation of the trolley wire above the track, and will also catch and hold the trolley rope should the trolley pole leave the wire and tend to rise above the same.

One object of my invention is to yieldingly and automatically stop the mechanism from further rotation when an upwardly flying trolley pole causes the stopping mechanism of the device to be thrown into operation.

Another object of my device is to gradually brake the rotation of the revolving parts until the same are brought to a final stop in place of stopping the revolving parts suddenly.

Still another object of my invention is to prevent disengagement of the stopping mechanism upon a rebound of the trolley pole. After the stopping mechanism has been thrown into action by the sudden rising of the trolley pole, the trolley pole will be brought to a stop, and rebound, which is a revolution of the rotating mechanism in the opposite direction and tends to permit disengagement of the stopping mechanism.

Other objects of the invention will be brought out as the construction and operation of my invention is more fully disclosed and set forth hereinafter.

Figure 1:
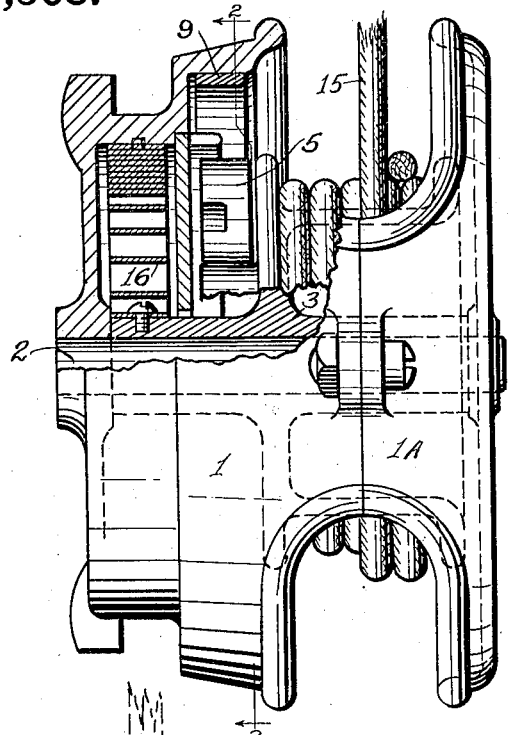
Figure 1 is a side elevation view of my invention in partial section to set forth the relation of the various parts.
Figure 2:
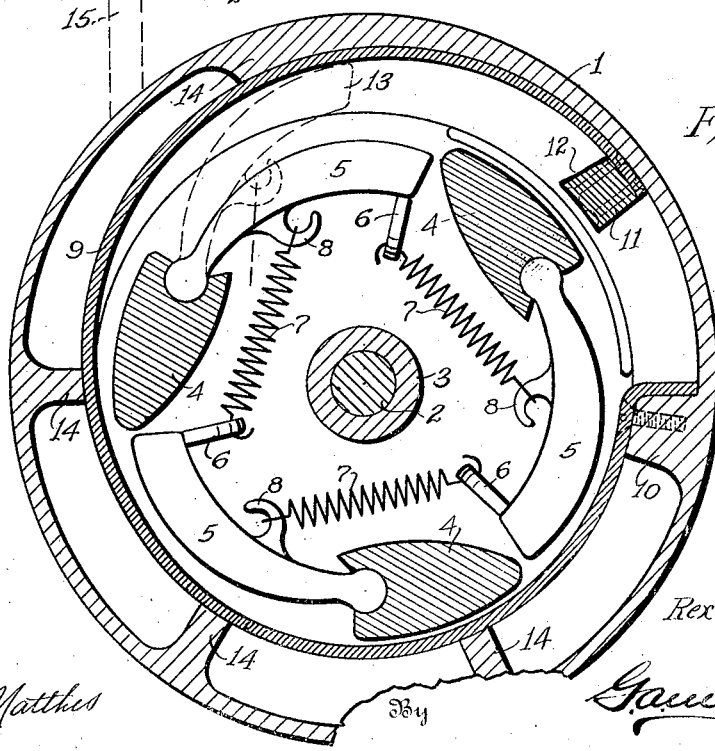
Fig. 2 is a section of my invention on the line 2—2, Fig. 1 and shows further the relation of parts of my invention not clearly set forth in Fig. 1.

Referring to the drawings—the casing is divided vertically and the two halves 1 and $1^A$ are secured together by bolts and nuts. Passing through the casing and attached to the parts 1 and $1^A$ is a shaft 2 and this shaft acts as a support for the drum or reel 3 and upon which the drum or reel rotates in either direction. Attached to the drum or reel are supporting lugs 4 which may be one in number or more, and pivotally secured to each lug is a centrifugal dog or pawl 5 held inwardly against a stop 6 by a spring 7 secured to a hook 8 which in turn is attached to the dog or pawl 5. Located between the parts just described and the casing is a flat spring 9 secured to the casing 1 by attachment to the lug 10 which forms a part of the casing. This spring 9 is shown as partially surrounding the drum or reel 3.

To the spring 9 is secured a projecting lug or stop 11 and provided with one face 12 which is sloping and adapted to engage the end face of the dog or pawl 5 and which is also provided with a sloping face to correspond with that of the face 12 on the lug 11.

Figure 3:
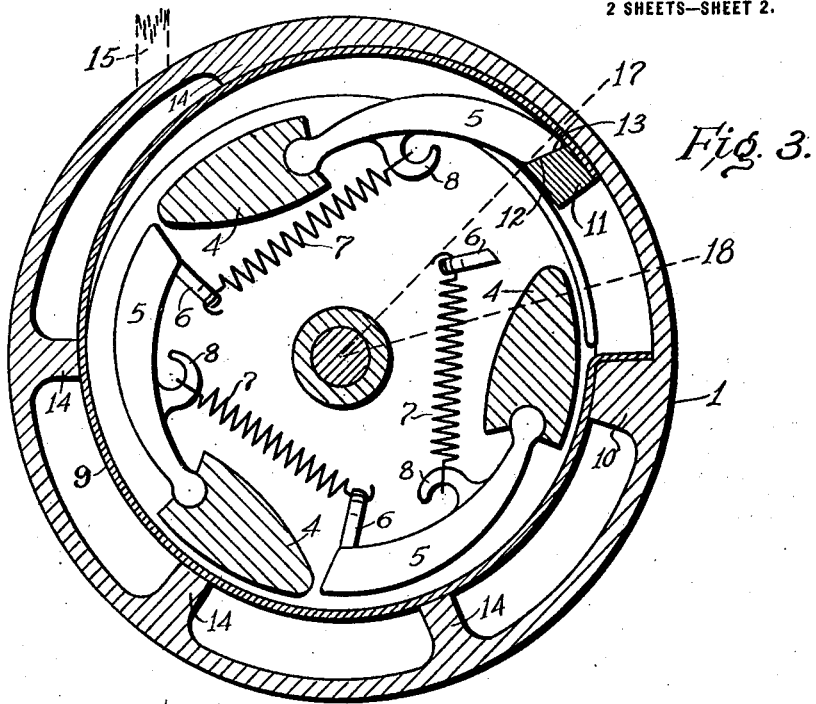
Figs. 3 and 4 are sectional views of my invention on the line 2—2, Fig. 1, but show the parts of the stopping mechanism in different positions of operation, which will be more clearly described as the specifications proceed.
Figure 4:
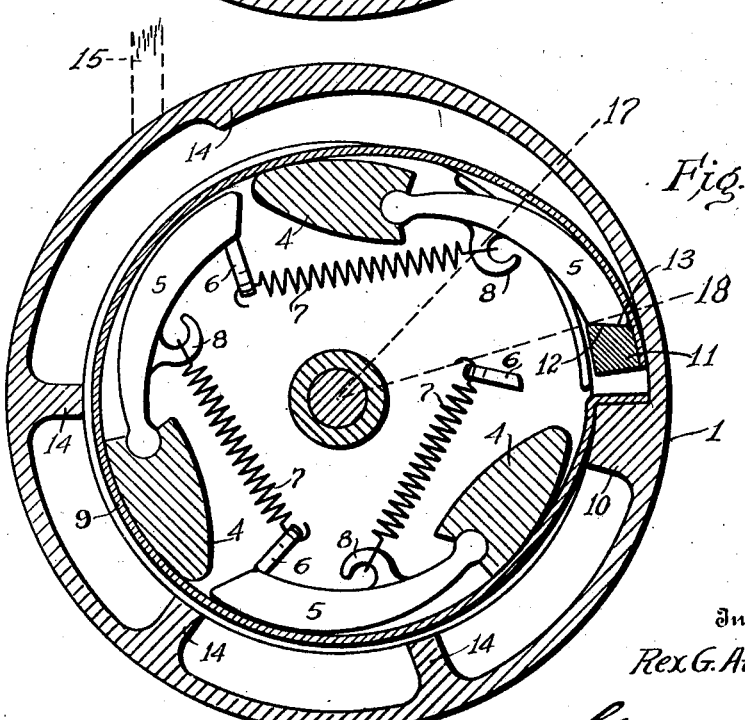

Secured to the case 1 and forming a part thereof are several face lugs 14 which serve as a stop or rest for the spring 9 and maintain the spring 9 in proper relation to the revolving drum 3, as shown in Figs. 3 and 4.

The trolley rope 15 is secured to the drum and is adapted to be wound on and unwound therefrom. The rotating action of the drum is permitted by the rise and fall of the trolley pole to which the outer end of the trolley rope 15 is attached. The unwinding of the rope from the drum is due to the trolley pole rising and the "winding up" of the rope, to the extent of taking in all slack and maintaining the rope in a taut condition, is made possible by the spring 16, one end of which is secured to the drum 3 and the other end to the casing 1.

While I have described the novel construction, combination and arrangement of the various parts which are essential to my invention and which are shown in the various figures, it is to be understood that various modifications may readily be made and still be within the scope of my invention.

The operation of my invention is as follows:—In the operation of electric roads using the overhead trolley pole, one of the disadvantages to the use of the trolley pole is that it will suddenly and unexpectedly leave the trolley wire for various causes.

When a trolley pole leaves the trolley wire it is desirable to catch or retard its upward movement quickly and as positively as possible, otherwise it will rise to a considerable height and under the advance movement of the car will strike the next trolley wire support or cross span wire and be thrown downward with considerable force which will drive it far below the span wire or support and it will rise with considerable momentum to a greater height than previously and strike the following support or span wire with a much stronger force or blow and this will probably result in a broken trolley pole or a broken overhead support and the tearing down of considerable overhead trolley wire at a great expense for repairs and possible loss of life.

A car equipped with my invention is provided with an automatic trolley pole tender such that when the trolley pole leaves the wire and starts to rise rapidly it will carry with it the trolley rope 15 and will cause the drum 3 to rotate rapidly and throw the centrifugal dog 5 outwardly and in the path of the stop 11 which the dog will engage and after the reel has made a further revolution for a short distance, as will be fully explained hereinafter, the revolving drum will be brought to a stop and the upwardly flying trolley pole will come to a rest.

The springs 7 are so tensioned that at a certain predetermined rate or speed of revolution of the drum 3 one of the dogs 5 will fly outwardly and engage the stop 11 and the further rotation of the drum will be so small that the trolley pole will rise only a very short distance above the trolley wire. This will permit the trolley pole to strike the overhead support or span wire ahead of the point where the trolley pole leaves the wire, but as the device has permitted the trolley pole to rise only a short distance above the trolley wire the blow upon the overhead span or support wire will be more of a glancing character due to the angle of the pole and no damage will result to the overhead support or the trolley pole. The trolley pole will, however, be thrown downwardly and it is quite desirable, in fact necessary from the standpoint of protecting the overhead structure, that the dog or pawl 5, after it has engaged the stop 11 and the upward movement of the trolley pole is arrested, should remain in engagement with the stop 11 during the period that the trolley pole is rebounding below its position of final rise. This will prevent the trolley pole from again rising higher than permitted by my invention when the stopping mechanism first operated and thereby prevents the overhead support from receiving more than glancing blows from the trolley pole.

To maintain the stopping devices in operative position during a rebound of the trolley pole, I have mounted the stop 11 upon a flat spring 9 in such a manner that the stop 11 can move forward under pressure of the centrifugal dog 5 which is thrown outward through the upward pull of the trolley pole upon the rope 15. This force exerted by the upward movement of the trolley pole will be sufficient to cause the stopping mechanism to move from the point on the line 17 shown in Fig. 3 where the stopping mechanism first engaged to the position shown on the line 18 in Fig. 4 where the stopping mechanism is at rest and has finally arrested the upward movement of the trolley pole. The angular movement of the drum after the stopping mechanism has been thrown into action is indicated between the lines 17 and 18 and this distance can be varied in the mechanism by the relation of the spring 9 to the parts of the drum 3 and the size and tension of the spring 9 as will be later explained.

When the trolley pole rebounds, the drum will tend to revolve in the opposite direction through the action of the spring 16 but the stop 11 will also move backward on account of its being secured to the spring 9 and the pressure of the stop 11 against the dog 5 will maintain the dog 5 and the stop 11 in operative position through the angular distance represented between the lines 17 and 18.

If the dog 5 were to engage with a fixed or rigid stop on the case as for instance the lug 10, then any slight backward movement of the dog 5 would allow the dog to drop back against the stop 6 under the action of its spring 7 the instant that the trolley pole rebounded.

Another valuable feature of operation of my device brought about by the yieldable mounting of the stop 11 is that I am able to bring the reel or drum to a gradual stop rather than an abrupt stop through the action of the resilient member 9 which as the stop 11 is carried forward, is caused to gradually bind or press upon the moving part 4 of the drum and thereby acts as a friction brake and the farther the stop 11 moves from the point of engagement with the dog 5 and which is designated by the line 17 toward the point of final stop which is designated by the line 18, the tighter will the resilient band 9 bear upon the part 4 of the revolving drum.

This condition is illustrated in Figs. 3 and 4 in which the relation of the resilient member to the revolving drum 3 at the instant of making contact between the dog and stop illustrated in Fig. 3 and the relation between the resilient band 9 and the parts of the revolving drum when the drum has been brought to a stop, is shown by Fig. 4.

While the band 9 is shown as contacting and binding upon the part 4 of the revolving drum, it will be readily understood that the band 9 can be made to contact with any other suitable moving part of the drum and perform the same function.

The resiliency of the stop 11 and the gradual slowing down or braking of the revolving drum tends to reduce wear and tear upon the parts of the device by reducing the strains upon the various parts which would be the case if the drum made a sudden stop. Furthermore the rebound of the trolley pole is reduced through the fact that its upward movement is gradually stopped and is not an abrupt stop as would be the case when the rope suddenly ceases unwinding from the drum as would be the case should the drum suddenly stop revolving.

While I have illustrated and described only one method of carrying out my invention, still there are many modifications of the arrangement shown and described which may be made and will be apparent to one skilled in the art and which would still come within the scope of my invention and hence I do not wish to be limited except as required by the scope of the following claims.

What I claim is:—

1. A trolley tender comprising in combination a supporting case, a drum mounted therein to have a rope wound on and unwound therefrom, a spring adapted to rotate the drum in one direction, a dog pivoted on the drum to throw outwardly under an abnormal speed of the drum in a rope unwinding direction and to be held in an inward position by a spring when the drum is revolving at a normal speed and a stop rigidly attached to a resilient member which is secured to the case, the stop adapted to be engaged by the dog when thrown outwardly to gradually draw the resilient member into frictional engagement with the drum and stop the rotation of the drum.

2. A trolley tender comprising in combination a supporting case, a revolving drum therein, means to rotate the drum in one direction, a dog mounted on the drum and adapted to throw outwardly when a predetermined speed of rotation of the drum is exceeded and engage a stop, a stop to be engaged by the dog, a resilient member secured to the stop and to the case and permitting a yielding engagement between the stop and case when the drum is rotated at a predetermined speed and the resilient member adapted to simultaneously engage a part of the drum to retard its rotation.

3. A trolley tender consisting of a supporting case, a drum rotatably mounted therein, means to rotate the drum in one direction, a centrifugal dog mounted on the drum and adapted to swing outwardly, a projection on the drum to which the dog is pivotally secured, a flat spring surrounding the drum to engage the projection and in the path of the centrifugal dog, and a stop on the spring to engage the dog and stop the rotation of the drum when its speed of rotation exceeds a predetermined amount.

4. A trolley tender comprising in combination a supporting case, a rotatively mounted drum, means to rotate the drum, a centrifugal dog pivotally secured to the drum to swing outwardly when the drum attains a speed in excess of a predetermined speed, a stop to be engaged by the dog, a yielding member having one end secured to the case and the other end secured to the stop, the stop adapted to move in the direction of the engaging dog and draw the resilient member into engagement with the rotating drum to arrest its rotation.

5. A trolley tender comprising in combination a supporting case, a drum mounted therein to revolve in both directions, resilient means in the case to revolve the drum in one direction, a rope on the drum to revolve it in the other direction when unwinding therefrom, and yielding stop mechanism adapted to stop the rotation of the drum when operated by the unwinding of the rope, the yielding stop mechanism comprising a yielding member secured to the case and adapted to engage some part of the drum, a stop on the yielding member adapted to be engaged by a centrifugal dog on the drum, the dog on the drum adapted to engage the stop on the yielding member to advance the stop, and move the yielding member into frictional engagement with some part of the drum.

6. A trolley tender comprising a supporting case, a drum rotatively mounted therein, means in the case to revolve the drum in one direction and a rope adapted to revolve it in the other direction when unwound therefrom, and a flat yielding member directly engaging some part of the drum to frictionally retard its rotation when revolved in the rope unwinding direction.

7. A trolley tender consisting of a supporting case, a drum rotatively mounted therein, means in the case to revolve the drum in one direction and a rope adapted to revolve it in the other direction when unwound therefrom and a yielding stop mechanism adapted to first, frictionally engage directly and retard the rotation of the drum and, second, to positively stop the rotation.

8. A trolley tender comprising in combination a case, a drum in the casing, means for revolving the drum to wind a trolley rope thereon, and contractile means interposed between the drum and the casing for stopping the rotation of the drum by frictional engagement therewith.

9. A trolley tender of the class described comprising in combination a casing, a rotating drum in the casing, means for turning the drum to wind a trolley rope thereon and means for stopping the rotation of the drum comprising a centrifugal dog attached to the drum and a contractile friction band provided with means to be engaged by the dog, said friction band arranged to engage the rotating parts when engaged by the dog.

10. A trolley tender comprising in combination a casing, a drum in the casing, a spring normally operating to automatically turn the drum to wind a rope thereon and to be automatically wound when the rope unwinds from the drum, and frictional means directly engaging the rotating parts to retard the rotation thereof.

11. A trolley tender adapted to control the slack in a trolley rope comprising a casing, a drum for the rope, means for revolving the drum in one direction, a centrifugal stop member on the drum, a flat resilient member having one end fixed and the other end free and means thereon to be engaged by the centrifugal stop and the intermediate portion of the resilient member to engage the drum when the centrifugal stop engages the means on the resilient member to retard the rotation of the drum.

In testimony whereof I affix my signature.

REX G. AVERILL.